July 17, 1956        M. D. BUIVID        2,754,937
DAMPER FOR ROTARY WING AIRCRAFT
Original Filed Sept. 25, 1945        2 Sheets-Sheet 1
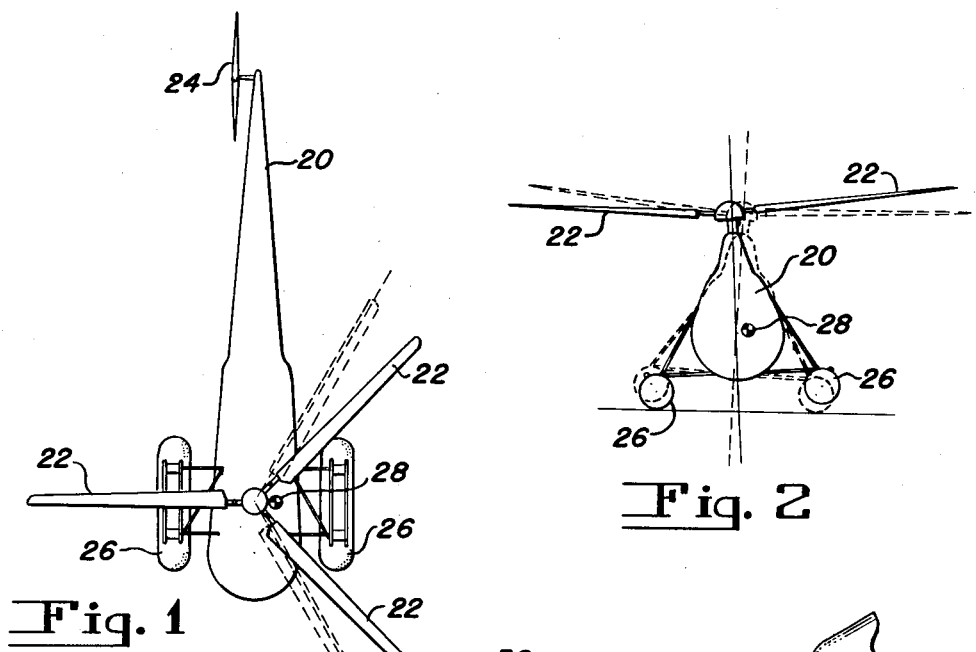
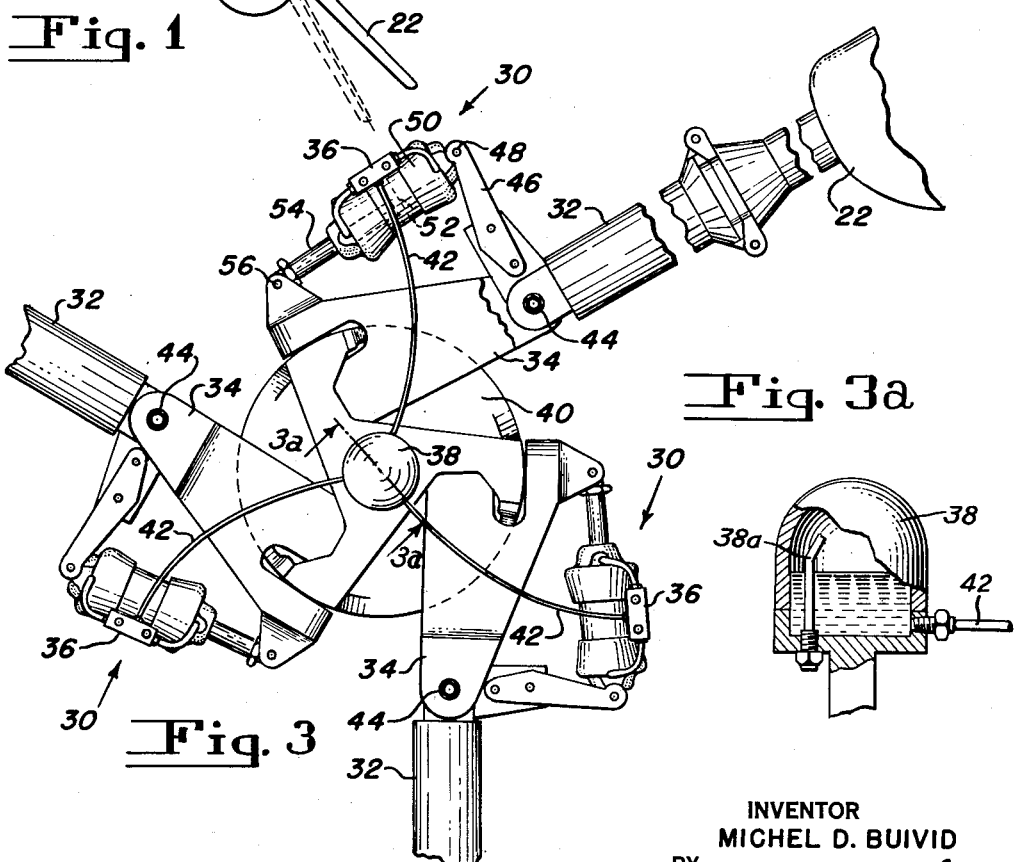
INVENTOR
MICHEL D. BUIVID
BY
ATTORNEY INVENTOR
MICHEL D. BUIVID
BY *M. B. Tasker*
ATTORNEY

United States Patent Office 2,754,937
Patented July 17, 1956

2,754,937
DAMPER FOR ROTARY WING AIRCRAFT

Michel D. Buivid, Milford, Conn., assignor to United Aircraft Corporation, East Hartford, Conn., a corporation of Delaware Original application September 25, 1945, Serial No. 618,560, now Patent No. 2,554,774, dated May 29, 1951. Divided and this application April 24, 1951, Serial No. 222,677

1 Claim. (Cl. 188—97)

This invention relates to damping means particularly adapted for use with rotary wing aircraft of the helicopter type such as shown in the application of I. I. Sikorsky, U. S. appl. Ser. No. 592,862, filed May 9, 1945, which matured into Patent 2,517,509 on August 1, 1950, and is a division of my application Serial No. 618,560, filed September 25, 1945, issued May 29, 1951 as Patent No. 2,554,774, and assigned to the same assignee as this application.

In carrying out my invention, dampers are provided between the flapping links and the spars of rotor blades in a manner to obtain the optimum ratio of weight to effort of the damper, while arranging the damper to generate low centrifugal forces. The dampers are constructed so as to have improved operating characteristics including self-priming action, and substantially constant effort in either sense for a constant applied force, even though the chambers of the damper do not have the same change of volume for a given piston displacement.

With such structure and arrangement of parts, this invention is capable of inhibiting "ground resonance" in helicopters, i. e. the generation of standing waves or vibrations in rotor blades in harmony with, and hence forced by, vibrations of a body carried by resilient gear upon the ground, or other surface, which vibrations increase with time, often to the extent of overturning or breaking parts of the aircraft. "Flight resonance" (similar to ground resonance; but due to pendular oscillations of the body of the craft in harmony with blade vibrations) is also inhibited to eliminate the danger of unstable flight due to vibrations.

Accordingly, an object of this invention is to provide a damper for dissipating vibrations by hydraulic integration thereof, and having improved structural and operating attributes over prior structures.

Another object, in keeping with the above object, is to provide a damper and self centering device for rotary wing aircraft for improving the operation thereof.

Another object is to provide a damper with biasing means for altering the characteristics thereof in powered flight with respect to unpowered flight, and to obtain a resilient drive.

The foregoing and other objects reside in the details of construction of the embodiment shown for carrying out this invention, and will be either obvious or pointed out in the following specification and claim.

In the drawings:

Figs. 1 and 2 are plan and front elevational views respectively showing a helicopter in "ground resonance";

Fig. 3 is a plan view of a rotor head for helicopters with one form of my invention applied thereto for inhibiting such action;

Fig. 3a is a view partly in section on lines 3a—3a of Fig. 3;

Figure 4:
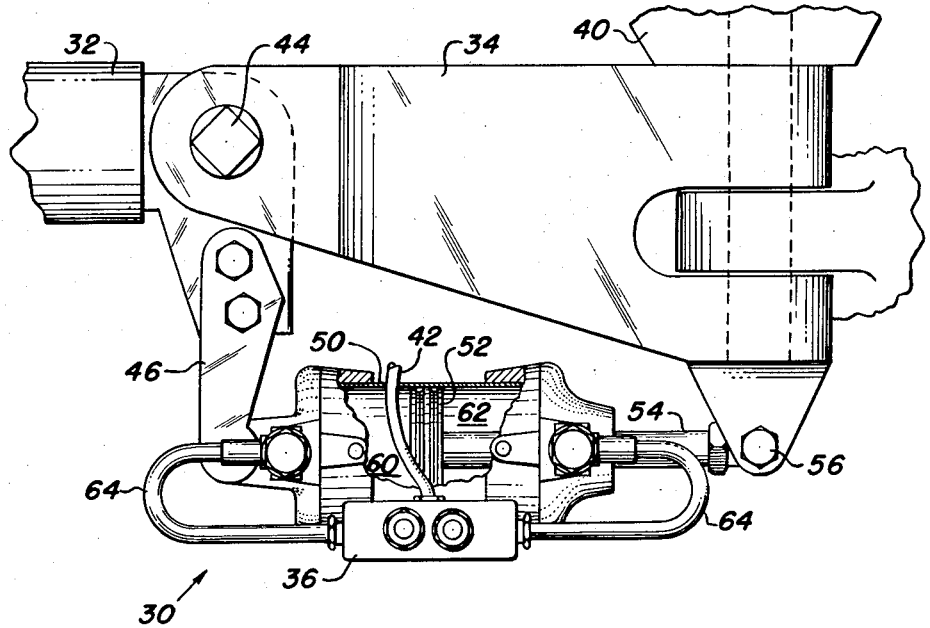
Fig. 4 is an enlarged view of one damper with the casing broken away to show the interior.

In Figs. 1 and 2, a helicopter is shown having a body 20, sustaining rotor blades 22, a torque compensating rotor 24 and mounting gear including a pair of floats 26 or wheels or the like which are capable of sustaining the helicopter upon water or solid surfaces. The helicopter is shown in a position which it would assume after having contacted the ground with the right hand side low as viewed in Figs. 1 and 2 due to an offset center of gravity 28. In Fig. 2, the dotted line position represents the attitude of the helicopter when the ground is first contacted, and the solid line position represents the beginning of harmonic rotary oscillation of the body 20 around the center of gravity 28.

In Fig. 1, the dotted line position of the two blades 22 on the right hand side of the craft is the normal attitude of the blades when the center-line of each of the blades of a three-bladed rotor is substantially 120-degrees angularly spaced from each other blade. The solid line position of the right hand blades 22 is a result of the rotary oscillation around the center of gravity 28 as described above. Inasmuch as the hub of the rotor blades 22 is moved toward the left because of such rotation, the instantaneous action (neglecting the rotary action of the entire rotor) will be to move out of the normal plan position and begin an oscillation. After moving into the position shown, the blades will be whipped due to their rotation into another position on the opposite side of the normal position and will oscillate across this normal position with a period determined by the geometry of the blades and the centrifugal forces acting thereon to force oscillations. With three blades as shown, it is possible to obtain oscillations in phase between different blades so that the net oscillation of all of the rotor blades 22 back and forth of the body 20 may occur at different frequencies. The oscillation of the body of the craft around the center of gravity will have a substantially constant period. However, if the two oscillations, or harmonics of such oscillations, should come into phase with each other, the vibrations would be forced with respect to each other and resonance will result. Such resonance will increase the amplitude of oscillation of the rotor blades 22 and increase the amplitude of rocking of the body 20 around the center of gravity 28 to such an extent that parts of the helicopter may be broken or the entire machine overturned.

I have provided means for preventing the oscillations from building up by shifting phase of the force from a rotor blade to the body of the helicopter, and applied this means to rotor blades in a manner to provide light weight but positive action. The device comprises hydraulic dampers with control means whereby the rate of change of motion of a rotor blade is controlled in either sense of motion of the rotor blade. A resistance is controlled under different operating conditions of the rotor blade in a manner to be particularly pointed out below in connection with the illustrated embodiment of the invention. It is to be understood, however, that the specific details of construction of the device are capable of taking forms other than that shown and the spirit of the invention is limited only by the claim.

In Fig. 3, three damping means 30 are shown as connected to spars 32 at one end and to flapping links 34 at their other ends. Inasmuch as each of the three is identical, only one will be described in detail. Each damper 30 is provided with a control valve 36 that connects with a reservoir 38 attached to the hub 40 mounting the rotor blade flapping links 34. The reservoir 38 may be of metal (or of transparent plastic construction to indicate the level of the fluid, preferably oil, therein) and hoses 42 connect the reservoir 38 with the valves 36. Each of the rotor blades 22 is connected by a drag pin 44 to the link 34 and pivots around the pin 44 to relieve stresses on the blade and permit the blade 22 to move into different positions during powered flight and during autorotational flight. An arm 46 is rigidly connected to the spar 32 at its inner end adjacent drag pin 44 and is connected at its outer end by pivot pin 48 to a housing 50 having a cylindrical inner bore. The housing 50 contains a piston 52 connected with a piston rod 54 secured by a pin 56 parallel with the pin 48, which passes through ears on the flapping link 34. The housing 50 is movable by the arm 46 and thus its position is determined by the position of the blade 22 as the latter moves about the drag pin 44. Thus, the entire damper 30 moves bodily with the flapping link 34 and the housing 50 moves relative to piston 52 in response to movements of blade 22 pivoted on said flapping link.

In Fig. 4, the housing 50 is shown as broken away in part and the piston 52 is shown in substantially a central position. As the spar 32 carrying the blade 22 rotates in a counterclockwise direction, the housing 50 will be moved toward the right with respect to the piston 52 to contract a left-hand chamber 60 and expand a right-hand chamber 62 defined by the piston 52 in the cylinder 50. Because the piston rod 54 extends into the chamber 62, the rate of change of volume in the chamber 62 will be smaller than the rate of change in volume of the chamber 60 and therefore the fluid, preferably oil, passing through pipes 64 will not be of equal quantity.

Figure 5:
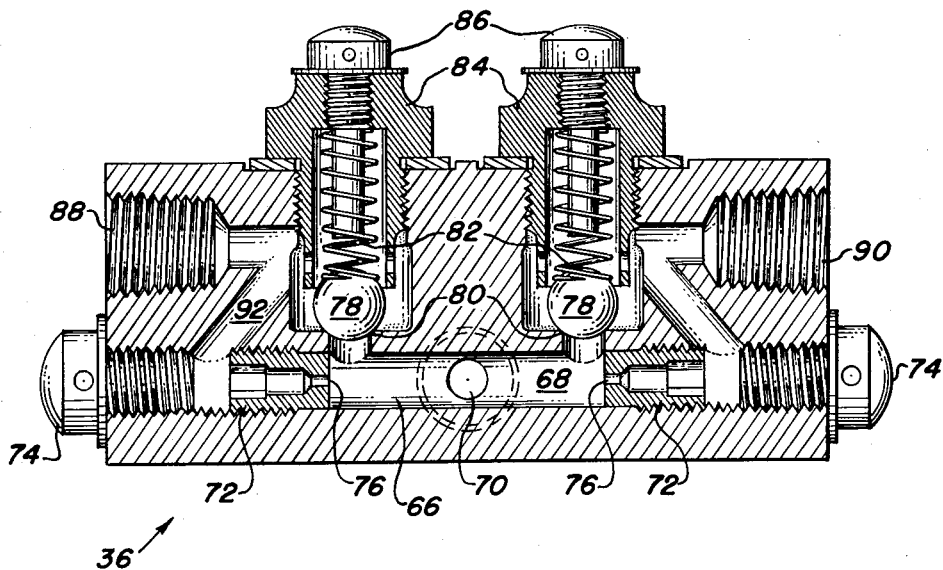
Fig. 5 is a section through the control valve of Fig. 4.

The control valve 36, shown in Fig. 5 in enlarged sectional detail, provides passages for passing fluid to and from the chamber 60, to and from the chamber 62 and also through the pipe 42 to and from the reservoir 38 as the movement of the piston 52 relative to the cylinder 50 requires. The pipes 64 are connected to the top of the cylinder 50 so air will bleed out of the chambers 60 and 62. The control valve mechanism 36 comprises a housing 66 having a through passage 68 communicating with a side passage 70 that connects with the hose 42. The passage 68 is tapped at its ends to receive restriction plugs 72 and seal off plugs 74. The restriction plugs 72 have orifices 76 which may be of equal or unequal sizes or may be adjustable needle valves, depending upon the characteristics desired for the operation of the damper. The plugs 72 can be removed from the tapped passage 68 and changed to change the characteristics of the damper. By-pass valves are provided in the form of balls 78 cooperable with seats 80 ground in the housing 66. The balls 78 are biased into engagement with the seats 80 by springs 82 which are mounted in ball guiding caps 84 provided with screws 86 through which entrapped air can be removed. The lowermost ends of the screws 86 serve as limit stops for the balls 78 to prevent excess movement thereof and damage to the springs 82. The balls 78 act as by-pass and check valves for fluid passing from one side of the piston 52 to the other, or from the reservoir 38 to either of the chambers 60 or 62. The springs 82 are of low tension so that only a small pressure of the fluid is required to lift the balls 78 from their seats. For example, one pound per square inch pressure with the ball seated has proved satisfactory in several installations. The larger chamber 60 connects with an inlet passage 88 of the control valve 36 and the smaller chamber 62 connects with an inlet 90 of the valve 36. Thus, for counterclockwise movement of the spar 32, fluid will flow from the chamber 60 through the left-hand pipe 64 into the inlet 88, through a passage 92, through the left-hand orifice 76, and into chamber 68. Fluid under pressure from inlet 88 also flows into the chamber above the valve seat 80 of the left-hand check valve and urges the ball 78 of this valve against its seat, while the ball 78 of the right-hand valve is similarly acted upon from above by the lower fluid pressure obtaining in the chamber 62. Hence fluid from chamber 68 will flow through the right-hand check valve into the smaller chamber 62 in part, and in part through the port 70, through the hose 42 to reservoir 38 to insure proper working of valves 78 (Fig. 5). The reservoir 38 is vented to atmosphere by means of a vent pipe 38a (Fig. 3a) so that atmospheric pressure is maintained at all times within the dampers 30, except during movement. Thus, for counterclockwise movement of the spar 32, resistance to motion is determined by the restriction of the left-hand orifice 76. For clockwise motion of the spar 32, resistance is determined by the right-hand orifice 76 coupled with the chamber 62. If it is desired that each sense of movement of the spar 32 exert equal force on the faces of the piston 52 to obtain equal damping of such motion, with unequal piston areas, the right-hand orifice 76 may be slightly smaller to create a somewhat higher unit pressure on the face of the piston forming the smaller chamber. With equal piston areas, equal orifices may be used with the valve described above.

As the blade 32 oscillates back and forth, the piston 52, and cylinder 50 will move relatively to each other. The damper 30 will operate due to resistance mentioned above to initially resist large blade movements but permit them to dissipate with time to a certain extent determined by the characteristics of the orifices 76. Upon reversal of the vibration, the opposite action will obtain. The result of vibration will be, therefore, an integrated action during transients, with a tendency in the system to resist accelerations equivalent to opposing motion of the blades with inertia.

Each chamber is connected to the vented reservoir through passages having check valves therein which are biased to remain closed when the pressure within the associated chamber is greater than atmospheric but which open readily upon the pressure dropping below atmospheric. With this arrangement a pressure other than atmospheric can exist only on one side of the piston when movement is in a given sense, thus preventing suction which could cause air to be drawn into the system. If any air should enter the system it is vented to the atmosphere through vent pipe 38a in the reservoir. Thus the dampers are all "hard" dampers in that they are, at all times, completely filled with oil and are therefore effective for even slight movements.

While I have shown and described one form which my invention may take, it is obvious that the parts thereof could be arranged somewhat differently to still obtain the objects of the invention. For example, the piping communicating between the chambers could be formed as cast passages in the housing. For these reasons, I do not wish to be limited to the form shown and described but by the scope of the following claim.

I claim:

An improved hydraulic drag hinge damper for helicopter rotor blades having an axis of rotation comprising cylinder and piston elements, one of which is movable and the other of which is relatively fixed, said cylinder and piston elements maintaining two closed variable volume chambers on opposite sides of said piston element as said movable element reciprocates through a full damper cycle relative to said stationary element, said chambers adapted to be filled with liquid, a control valve, said control valve having a first passageway extending therethrough, one end of said cylinder element being connected to said control valve at one end of said passageway, the other end of said cylinder element being connected to said control valve at the other end of said passageway, said control valve having two restricting plugs in said passageway forming a chamber therebetween, said plugs limiting the rate of liquid flow between said damper chambers uniformly throughout the entire damper cycle and being effective for the full length of travel of said piston element in said cylinder element, a liquid reservoir vented to the atmosphere, a second passageway connecting said reservoir to said chamber, a third passageway connecting said chamber to said first passageway between one of said plugs and a damper chamber, a fourth passageway connecting said chamber to said first passageway between the other of said plugs and the other damper chamber, a first by-pass valve being located in said third passageway, a second by-pass valve being located in said fourth passageway, each of said by-pass valves comprising a chamber having a ball located therein, each of said balls being spring biased so as to prevent entry of fluid into said chamber through each by-pass valve, the biasing force of each of said valves acting in a direction to permit fluid in said chamber to flow therethrough into a damper chamber when the pressure difference across the valve is greater than the biasing force.

References Cited in the file of this patent

UNITED STATES PATENTS

| | | |
|---|---|---|
| 1,522,912 | Robison et al. | Jan. 13, 1925 |
| 1,773,988 | Garrison | Aug. 26, 1930 |
| 1,923,038 | Mitchell | Aug. 15, 1933 |
| 1,932,770 | Crowe | Oct. 31, 1933 |
| 1,946,525 | Eickhoff et al. | Feb. 13, 1934 |
| 1,948,457 | Larsen | Feb. 20, 1934 |
| 2,040,262 | Kruckenberg et al. | May 12, 1936 |
| 2,070,799 | McKee | Feb. 16, 1937 |
| 2,216,163 | Ray | Oct. 1, 1940 |
| 2,465,681 | Gluhareff | Mar. 29, 1949 |
| 2,554,774 | Buivid | May 29, 1951 |
| 2,604,953 | Campbell | July 29, 1952 |

FOREIGN PATENTS

| | | |
|---|---|---|
| 492,881 | Great Britain | Sept. 28, 1938 |
| 502,340 | France | Apr. 20, 1917 |
| 805,057 | France | Aug. 17, 1936 |